June 11, 1968  F. PRAPIS ET AL  3,388,307
MOTOR LOAD LIMITING CIRCUITRY
Filed Oct. 22, 1964
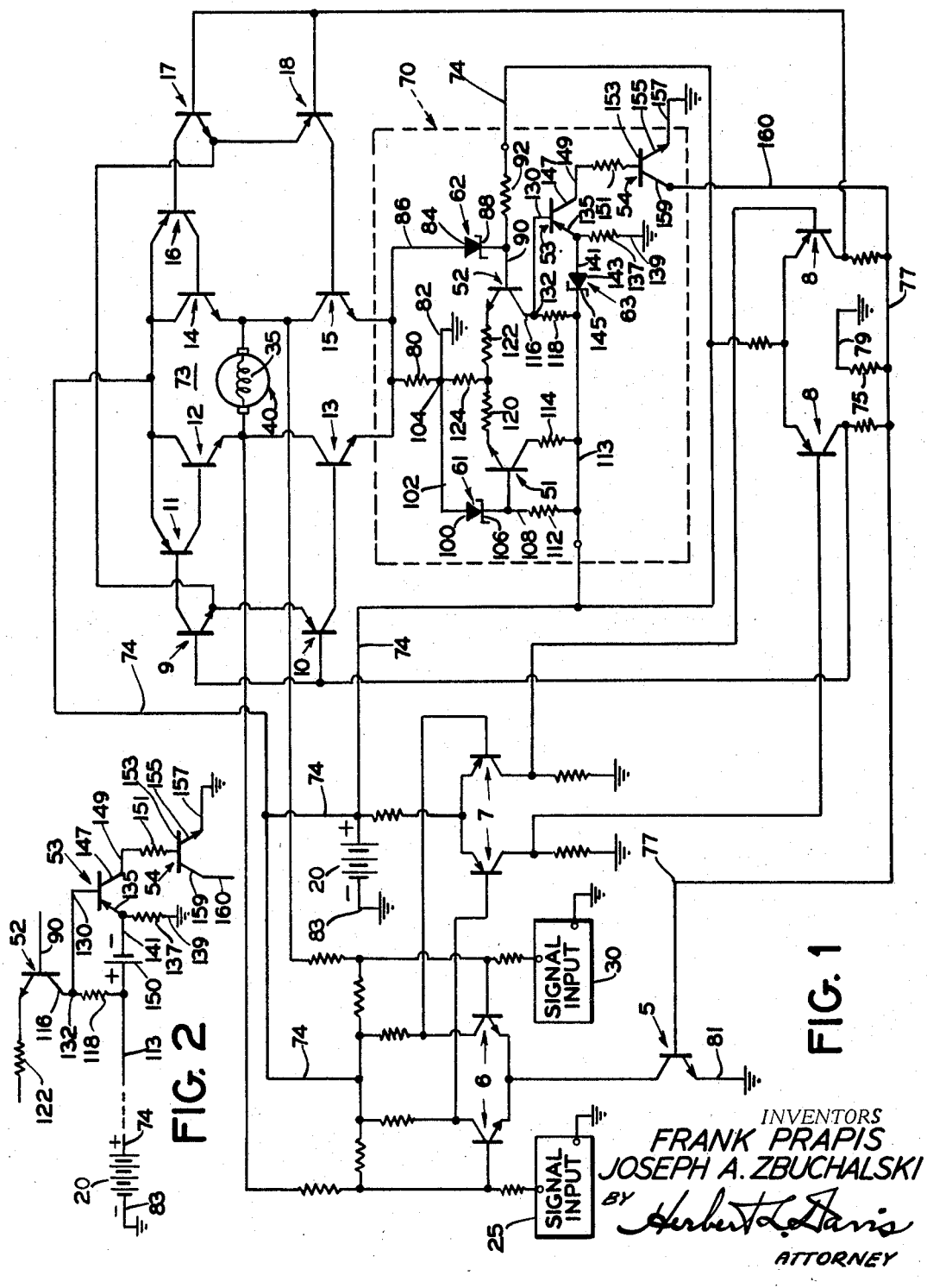
INVENTORS
FRANK PRAPIS
JOSEPH A. ZBUCHALSKI
BY Herbert L. Davis
ATTORNEY United States Patent Office 3,388,307
Patented June 11, 1968

3,388,307
MOTOR LOAD LIMITING CIRCUITRY
Frank Prapis, Paterson, and Joseph A. Zbuchalski, Lyndhurst, N.J., assignors to The Bendix Corporation, Teterboro, N.J., a corporation of Delaware
Filed Oct. 22, 1964, Ser. No. 405,711
4 Claims. (Cl. 318—434)

ABSTRACT OF THE DISCLOSURE

A current limiter for an electric motor including a variable gain amplifier for supplying current to the motor winding. Current sensitive means are provided for effecting a voltage drop proportional to the current supplied to the motor winding, and upon said voltage drop exceeding a predetermined threshold the variable gain amplifier is controlled in a sense to decrease the gain thereof so as to prevent excessive current from being supplied to the motor winding.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a load current limiter for a direct coupled amplifier and, more particularly, to a novel electronic control network for limiting with extreme accuracy the maximum load current that may be applied to an amplifier-driven motor.

It has been found that with an electric motor having a permanent magnet field, the flux from an excessively high armature current may demagnetize the field poles of the motor; an excessively high current applied to a recording pen operating motor may cause off scale travel; and solenoid type actuator forces may be too great if the driving current is excessive or not properly limited, therefore an object of the invention is to provide a novel electronic circuitry which may be applied to a differential type direct coupled amplifier so as to accomplish precise adjustable load current limiting to prevent excessive current from being applied to such a motor.

Another object of invention is to provide in a differential type direct coupled amplifier for a direct current motor, novel electronic circuitry to adjustably limit the current to the motor to a critical limited value by (1) sensing a current flow across a resistor in an output circuit of the direct coupled amplifier, (2) providing a second amplifier for this sensed current flow, (3) sensing a voltage across a second resistor in a circuit controlled by the second amplifier, (4) providing a Zener diode or auxiliary constant voltage source acting in opposition to a variable voltage drop provided across the second resistor and in which arrangement there is effected a critical threshold voltage (the constant voltage drop effected by the breakdown voltage across the controlling Zener diode or constant voltage of the auxiliary source) to provide a novel triggering means, and (5) providing means to sense a difference in the voltages of said triggering means and effective upon the variable voltage drop across said second resistor just exceeding the critical threshold voltage to adjust an operative setting means of the differential type direct coupled amplifier for the D.C. motor so as to limit the current supplied to the motor through the last mentioned amplifier to a critical limited value.

Another object of the invention is to provide in the last mentioned current limiting circuitry a novel triggering means including a Zener diode having an operative characteristic such as to effect a sharp transition in the conductivity thereof in a reverse direction under normal operating voltage and effective under such operating conditions to hold the voltage drop across the Zener diode constant by the Zener action thereof, the voltage drop across the Zener diode acting in opposition to the variable voltage drop across the second resistor in the output of the current sensing amplifier and the latter variable voltage drop upon exceeding a critical threshold voltage set by the constant voltage drop provided across the Zener diode bringing into operation a differential voltage sensing means to adjust the operative setting of the amplifier for the D.C. motor so as to thereby limit the current supplied to the motor to a critical limited value.

Another object of the invention is to provide in such a current limiting circuitry a novel triggering means including an auxiliary constant voltage source or biasing battery acting in opposition to the variable voltage drop across the second resistor in the output of the current sensing amplifier, and the latter variable voltage drop upon exceeding a critical threshold value set by the constant voltage source bringing into operation a differential voltage sensing means to adjust the operative setting of the amplifier for the D.C. motor so as to thereby limit the current supplied to the motor to a critical limited value.

Another object of the invention is to provide a novel electronic means to effect extreme accuracy in the limiting of load current to a motor.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings, in which corresponding parts have been indicated by corresponding numbers:

FIGURE 1 is a schematic wiring diagram of a differential type direct coupled amplifier for a D.C. motor including a novel load current limiting electronic network embodying the present invention.

FIGURE 2 is a partial schematic wiring diagram of a modified form of the triggering means for the current limiting network of FIGURE 1 in which other parts of the modified system not shown may be identical to the parts shown in FIGURE 1.

Referring to the drawing of FIGURE 1, the transistors 5, 6, 7, 8, 9, 10, 11, 12, 13, 14, 15, 16, 17, and 18 and the electrical connections thereof to a main source of direct current or battery 20, as shown, comprise an amplifier and current regulation bridge portion which may utilize familiar techniques well known in the art for obtaining voltage and power gain with differential gain stages of direct current input signals applied in conventional manner at 25 and 30 for application to a single load winding 35 of a conventional D.C. motor 40.

The operation of such a differential type direct coupled amplifier and the differential amplification principles thereof are well known and a detail description thereof at this time is not deemed necessary inasmuch as the present invention is directed to inclusion with such a differential amplification means of a novel load current limiting network including transistors 51, 52, 63, and 54; Zener diodes 61, 62, and 63 and the interconnecting network and associated components shown in the dotted line box 70, as hereinafter explained, and which limiting network 70 is arranged to sense an output current applied from the differential amplification means through a resistor 80 to effect an adjustment of an operative setting of the differential amplification means for the D.C. motor 40 so as to limit the current supplied to the winding 35 of the motor 40 to a critical limited value. The limiting network 70 is the subject matter of a divisional U.S. application Ser. No. 621,540, filed Mar. 8, 1967, by Frank Prapis and Joseph A. Zbuchalski and assigned to The Bendix Corporation, assignee of the invention described and claimed herein.

Thus, in the differential amplification means for the low current supplied to the D.C. motor 40, voltages at the collectors of the transistors 6, 7, and 8 are established by the proper selection of the resistances in the collector circuits and by the current supplied from the collector of the transistor 5. A resistor 75 in the collector circuits of the transistors 8 develops a voltage proportional to the sum of the two collector currents from the transistors 8. This voltage, applied through a line 77 to a base of the transistor 5 and through a grounded connection 79 to a grounded connection 81 leading from the emitter of the transistor 5, provides a base input bias to the transistor 5 which serves to regulate the operating current supplied through the collector of the transistor 5 to the emitters of the transistors 6 and through the collector outputs of the transistors 6 to the bases of the transistors 7 through the collector outputs of transistors 7 to the bases of the transistors 8, as shown in the drawing of FIGURE 1.

As hereinafter explained in greater detail, the novel current limiting network 70, by regulating the operating current supplied to the base of the transistor 5, provides a feedback loop which limits the current supplied by the differential amplification means to the winding 35 of the D.C. motor 40 to a critical limited value.

In the aforenoted arrangement with correct quiescent operating currents from the D.C. signal inputs 25 and 30, the transistors 6, 7, and 8 perform normally as differential amplifiers for regulating a bridge circuit 73, including transistors 12, 13, 14, and 15, providing the operating load current for the single motor winding 35 of the D.C. motor 40. The network 70, however, provides an additional control for the current supplied through a conductor 77 to the base of the transistor 5 in forcing the collector current of the transistor 5 toward cut-off in the event the current supplied to the motor winding 35 of the D.C. motor 40 should tend to exceed a predetermined critical value. Thus, through the operation of the load current limiter network 70, the gain of the transistors 6, 7, and 8 will begin to deteriorate at some reduced value of the collector current from the transistor 5 so that, in fact, in an extreme condition the gain may drop to zero, with complete cut-off of the collector current from the transistor 5. It is this characteristic that is utilized to effect the output load current control in the present invention.

In the operation of the load current limiter network 70, the load current to the motor winding 35 of the D.C. motor 40 is controlled by a bridge circuit 73 including transistors 12, 13, 14, and 15 and this load current, in turn, flows through a conductor 74 from the positive terminal of the source 20 to the bridge circuit 73 and, upon an unbalancing of the bridge circuit 73 by operation of the differential amplifiers, load current is applied through the motor winding 35 connected across the bridge circuit 73 and then from the emitter elements of the bridge transistors 13 and 15 through a resistor 80 to a grounded connection 82 leading to the negative terminal of the D.C. source 20 through a grounded connection 83. In the novel load current limiter network 70, there is provided the Zener diode 62 which has an anode element 84 connected by a conductor 86 to that end of the resistor 80 connected to the emitter elements of the bridge transistors 13 and 15 and a cathode element 88 connected by a conductor 90 to the base element of the transistor 52 which may be of an NPN type. The conductor 90 is also connected by a resistor 92 to the conductor 74 leading from the positive terminal of the main source of direct current or battery 20, which has the negative terminal thereof connected by the conductor 83 to ground.

Further, in the load current limiter network 70, the Zener diode 61 has an anode element 100 connected by a conductor 102 to a point 104 on the conductor 82 intermediate the resistor 80 and the grounded connection therefrom through the conductor 82. The Zener diode 61 has a cathode element 106 connected by a conductor 108 to the base of the transistor 51 which may also be of the NPN type. The conductor 108 is also connected through a resistor 112 to a conductor 113 connected to the conductor 74 leading from the positive terminal of the source of direct current or battery 20.

The transistor 51 also has a collector element connected by a resistor 114 to the conductor 113, while the transistor 52 has a collector element connected through a conductor 116 and a resistor 118 to the conductor 113 and thereby to the positive terminal of the D.C. source 20. The transistors 51 and 52 have emitter elements connected, respectively, through resistors 120 and 122 and a resistor 124 to the grounded conductor 82 at the point 104. The conductor 130 leads from the point 132 on the conductor 116 to a base of the transistor 53 which may be of the PNP type, having an emitter element 135 connected by a resistor 137 to a grounded conductor 139. The emitter element 135 is also connected by a conductor 141 to an anode element 143 of the Zener diode 63 having a cathode element 145 connected to the conductor 113 and therethrough to the conductor 74 leading from the positive terminal of the main source of direct current or battery 20. The PNP type transistor 53 further has a collector element 147 connected by a conductor 149 and a resistor 151 to a base element 153 of the transistor 54 which may be of the NPN type. The NPN type transistor 54 has an emitter element 155 connected by a conductor 157 to ground and a collector element 159 connected by a conductor 160 to the conductor 77 and thereby to the base of the transistor 5 which may also be of the NPN type.

The Zener diodes 61, 62, and 63 are of a type having a unique reverse current breakdown characteristic which permits conduction in the back direction when voltages exceeding certain values are applied. Moreover, each Zener diode in the reverse or back direction has a substantially constant threshold potential below which it is nonconductive and above which it is conductive and a substantially constant impedance when conductive. The Zener diodes 61 and 62 have identical breakdown characteristics, while the Zener diode 63 has a higher level breakdown characteristic at which it becomes conductive in the reverse direction and under which conditions the voltage drop across the Zener diode 63 is held constant by the Zener action even though the current flow through the Zener diode 63 may increase.

The constant voltage drop thus provided across the Zener diode 63 opposes the effect of the variable voltage drop across the resistor 118 on the transistor 53 in a triggering circuit in which the base and emitter elements of the transistor 53 are connected across the resistor 118 and the Zener diode 63 through the conductors 130 and 141, respectively.

The constant breakdown voltage drop across the Zener diode 63 thus provides a threshold voltage which is effectively applied as a controlling positive potential to the base of the transistor 53 and negative bias to the emitter 135 so long as the constant voltage drop across the Zener diode 63 exceeds the variable voltage drop across the resistor 118 effected by the current flow in the collector circuit to the transistor 52. This threshold voltage acts in a sense to render the transistor 53 nonconductive between the collector 147 and the emitter 135 of the transistor 53.

However, upon the variable voltage drop across the resistor 118 effected by the current flow in the collector circuit to the transistor 52 increasing to a value just above the threshold voltage effected by the constant voltage drop across the Zener diode 63 as upon the load current through the resistor 80 exceeding a critical limit value, then the greater variable voltage drop across the resistor 118 is effectively applied as a controlling positive potential to the emitter 135 and negative bias to the base of the transistor 53 so long as the constant voltage drop across the Zener diode 63 is exceeded by the variable voltage drop across the resistor 118 so as to render the transistor 53 conductive between the collector 147 and the emitter 135 of the transistor 53 to limit the load current to be applied to the winding 35 of the D.C. motor 40, as hereinafter explained.

In the modified form of the triggering means shown in FIGURE 2, an auxiliary source of constant voltage or a battery 150 provides a biasing voltage of somewhat less value than the main voltage source 20. The biasing battery 150 is arranged in place of the Zener diode 63 of FIGURE 1 with the positive terminal of the battery 150 being connected to the conductor 113 leading to the positive terminal of the main source 20 and through the resistor 118 to the base of the transistor 53, while the negative terminal of the battery 150 is connected to the conductor 141 leading to the emitter 135 of the transistor 53 and through the resistor 137 and grounded conductor 139 to the negative terminal of the main source 20.

The biasing battery 150 thus provides a threshold voltage which is effectively applied as a controlling positive potential to the base of the transistor 53 and negative bias to the emitter 135 so long as the variable voltage drop across the resistor 118 effected by the current flow in the collector circuit to the transistor 52 from the main source 20 does not exceed the biasing voltage of the battery 150, whereupon the transistor 53 is rendered nonconductive between the collector 147 and the emitter 135.

However, upon such variable voltage drop across the resistor 118 exceeding the threshold voltage of the biasing battery 150, then the greater voltage drop across the resistor 118 is effectively applied as a controlling positive potential to the emitter 135 and negative bias to the base of the transistor 53 so as to render the transistor 53 conductive between the emitter 135 and the collector 147 of the transistor 53 to limit the load current to be applied to the winding 35 of the D.C. motor 40, as hereinafter explained.

*Operation*

In the aforenoted arrangement of the novel load current limiter network 70, it will be seen that the load current, as controlled by the bridge transistors 12, 13, 14, and 15, flows through the resistor 80 to the grounded terminal 82. The resulting small voltage drop across the resistor 80 is applied through the Zener diode 62 to the base of the transistor 52. The Zener diode 62 passes a current proportional to the voltage drop across resistor 80 to the base of the transistor 52, while the Zener diode 61 holds the base of the transistor 51 at a constant potential.

The arrangement of the transistors 51 and 52 comprises a differential amplifier such that, in the event there is no flow of load current from the bridge 73 through resistor 80, the Zener diodes 61 and 62 permit a reverse flow of current therethrough to the grounded conductor 82 while maintaining no difference in the potential at the bases of the transistors 51 and 52 and the points at the opposite ends of the resistor 80. Thus, there would be a quiescent flow of current from the emitters of the transistors 51 and 52 through resistor 124 and quiescent conduction between the collectors and emitters of the transistors 51 and 52, resulting in an equal quiescent flow of current through the resistors 114 and 118.

However, in the event there is a flow of load current from the bridge 73 through the resistor 80, then the Zener diode 62, being connected at the positive end of the resistor 80, passes a current to the base of the transistor 52 proportional to the small voltage drop across the resistor 80 which renders the transistor 52 more conductive between the collector and emitter elements thereof so that there is applied across the resistor 118 in the collector circuit of the transistor 52 a potential drop and across the resistor 124 in the emitter circuit a potential drop which, in both cases, increases in proportion to the drop across the resistor 80, while the transistor 51, having its base connected by the Zener diode 61 to the point 104 at the opposite negative end of the resistor 124 from the emitter of the transistor 51, is rendered less conductive between the collector and emitter elements thereof with the resulting increase in current flow through the resistor 124. Thus, the transistor 51 is so arranged as to decrease the flow of current across the resistor 114 in the collector circuit of the transistor 51 with the increase in the voltage drop across the resistor 80.

Further, it should be noted that the transistor 53, having its base and emitter connected across the resistor 118, is normally cut-off biased by the voltage of the biasing battery 150, as shown in FIGURE 2, or as shown in FIGURE 1, by the breakdown voltage drop across the Zener diode 63 which has the anode element 143 thereof connected to the emitter element 135 of the transistor 53, while the cathode element 145 of the Zener diode 63 is connected to the conductor 113 leading from the positive point of the resistor 118 and through the conductor 74 from the positive terminal of the source of direct current or battery 20, while the negative point of the resistor 118 is connected through the conductor 130 to the base of the transistor 53.

The emitter element 135 of the transistor 53 is also connected through the resistor 137 and grounded connection 139 to the negative terminal of the D.C. source or battery 20. Thus, the PNP type transistor 53 is normally biased to cut off so long as the potential drop across the resistor 118 does not exceed the constant voltage drop across the Zener diode 63 of FIGURE 1 or the biasing voltage of the battery 150, as shown by FIGURE 2.

However, upon the potential drop across the resistor 118 increasing to above the critical constant biasing voltage of the battery 150 of FIGURE 2, or the constant voltage drop across the Zener diode 63 of FIGURE 1, as upon the load current flowing through the resistor 80 exceeding a predetermined maximum load current value, whereupon the emitter 135 is now positively biased with respect to the base of the transistor 53 so that current conduction starts from the emitter 135 to the collector 147 of the PNP type transistor 53 and the current flows through the conductor 149 and the resistor 151 to the base 153 of the transistor 54 and returning through the emitter 155 and grounded conductor 157 to the negative terminal conductor 83 to the source of D.C. 20.

The NPN type transistor 54 is thereupon so biased as to start conduction between the collector 159 and emitter 153 of the transistor 54 and to, in turn, thereby divert or shunt current from the base of the transistor 5. By appropriate adjustment of the value of the resistor 80 and the gain of the transistors 51 and 52, the base drive of transistor 5 will assume a value which decreases the gain of the transistors 6, 7, and 8 so as to just maintain a particular value of current through the resistor 80.

Circuits typical of the differentially connected transistors 51 and 52 require a resistor 124 comparable in value to the resistor 118 to minimize the operating point shift with environable changes. Voltages at the bases of the transistors 51 and 52, as a consequence, must be raised to match the voltage drop across the resistor 124. The correct base bias is established by the Zener diodes 61 and 62 drawing current through the resistors 112 and 92, respectively. The Zener diode 62 passes a current proportional to the voltage across the resistor 80 to the base of the transistor 52, while the Zener diode 61 holds the base of the transistor 51 at constant potential. Resistors 120 and 122 are degenerative elements which can be used to vary the transistor gain and operating points.

Furthermore, it is seen that when the transistor 54 becomes conductive from the collector element 159 to the emitter element 155, this changes the operating points for the transistors 5, 6, 7, and 8 such that the collector currents from the transistors 8 applied through the transistor 54 rise to decrease the differential voltage across the transistors 8 so as to, in turn, regulate the transistors 12, 13, 14, and 15 of the bridge 73 to limit the current applied through the load winding 35 of the motor 40 to the critical limited value.

In the operation of the triggering means of FIGURE 1, the resistor 137 and the Zener diode 63 in series therewith draw current from the main source or battery 20 (for example, 24 volts) to break down the Zener diode 63 so as to cause conduction in a reverse or back direction from the cathode 145 to the anode 143 at its characteristic breakdown voltage (for example, 12 volts) and under which condition the breakdown voltage drop across the Zener diode 63 will be held constant under varying current flow conditions due to the characteristic Zener action of the Zener diode 63. Under normal load current operating conditions of the motor 40, the voltage drop across the Zener diode 63 will bias the transistor 53 to a "cut-off" or nonconductive condition between the collector 147 and the emitter 135.

However, as the current flow in the resistor 118 and in the collector circuit of the transistor 52 from the main source or battery 20 increases in response to an increase in the load current in resistor 80, the voltage drop across the resistor 118 will increase until, at a critical value, the voltage drop across the resistor 118 will exceed the opposing voltage drop across the Zener diode 63, whereupon the transistor 53 will be forward biased by the difference in said voltages so as to become conductive between the emitter 135 and the collector 147 of the transistor 53 to bring into operation the transistor 54 to, in turn, regulate the transistor 5 to limit the load current applied to the winding 35 of the motor 40.

Furthermore, it will be noted that the breakdown voltage drop across the Zener diode 63 remains constant due to the Zener action of the Zener diode 63 even though the transistor 53, upon becoming conductive between the emitter 135 and the collector 147, may act to increase the current flow through the Zener diode 63. The breakdown voltage drop across the Zener diode 63 thus provides a threshold voltage which sets the limiting point for the load current in the D.C. motor 40.

In the operation of the triggering means of FIGURE 2, the auxiliary constant voltage source or battery 150 has a voltage (for example, 12 volts) somewhat less than that of the main voltage source or battery 20 (having, for example, a voltage of 24 volts). The battery 150, moreover, has a potential many times greater than the "cut-off" value of the transistor 53.

Moreover, during normal load current operating conditions of the motor 40, the current flow through the resistor 118 and in the collector circuit of the transistor 52 provides a voltage drop of somewhat less than that of the biasing battery 150 (for example, a voltage drop of about one-half the voltage of the battery 150).

However, when the current flow through the resistor 118 increases in response to an increase in the load current through resistor 80 to make the voltage drop across the resistor 118 just exceed the opposing biasing force of the battery 150, the transistor 53 goes into conduction between the emitter 135 and the collector 147 to initiate the load current limiting action through the operation of the transistor 54 and the regulation of the transistor 5, as heretofore explained. The voltage of the biasing battery 150 in the arrangement of FIGURE 2 thus sets the limiting point for the load current of the D.C. motor 40.

The Zener diodes 61 and 62 establish the operating base voltages for the transistors 51 and 52 in an arrangement in which the base and emitter of the transistor 52 are connected across the resistor 80 so as to sense the voltage drop across the resistor 80, while the base and emitter of the transistor 51 are so connected that the base of the transistor 51 is held at a constant potential.

Thus, through the novel arrangement of the Zener diode 61 in relation to the transistor 51 and in association with the Zener diode 62 in relation to the transistor 52, there is effected a voltage across the resistor 118 in response to the load current applied through the resistor 80 which is sensed by the transistor 53, as controlled by the threshold voltage effected by the Zener diode 63 of FIGURE 1 or the battery 150 of FIGURE 2, so as to, in turn, act through the transistor 54 to readjust the setting of the transistor 5 and thereby readjust the differential amplifier through the transistors 6, 7, and 8 in a sense to decrease the gain thereof and thereby maintain the load current within a particular critical limit as reflected by the current flow through the resistor 80.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a load current limiter network of a type including an electric motor, an energizing winding for the motor and variable gain amplifier means for supplying load current to the motor winding, the improvement comprising:

means sensitive to the load current supplied to the motor winding by the variable gain amplifier means, said means including a second amplifier means, an input circuit for said second amplifier means sensitive to the load current supplied to the motor winding, and an output circuit for said second amplifier means including a resistor controlled by said second amplifier means for effecting a voltage drop proportional to the load current supplied to the motor winding; and triggering means including control means, a constant voltage source operatively connecting the control means across the resistor and effecting a threshold voltage acting in opposition to the voltage drop across said resistor and in a sense to maintain said control means ineffective until the voltage drop exceeds the threshold voltage, and said control means being thereupon rendered effective by the greater voltage drop across said resistor to control the variable gain amplifier means in a sense to decrease the gain thereof so as to prevent excessive load current from being supplied to said motor winding.

2. The combination defined by claim 1 in which said triggering means includes a Zener diode operatively connecting said control means across said resistor, means for effecting a constant breakdown voltage drop across said Zener diode to provide a threshold voltage acting in opposition to the voltage drop across said resistor and in a sense to maintain said control means ineffective until the voltage drop across said resistor exceeds said threshold voltage, and said control means being thereupon rendered effective by the greater voltage drop across said resistor to control said variable gain amplifier means in a sense to decrease the gain thereof so as to prevent excessive load current from being supplied to said motor winding.

3. In a control system of a type including an electric motor, an energizing winding for the motor, first and second direct current signal means, a differential amplifier means including means for varying gain of said amplifier means, input means for said differential amplifier means controlled by said direct current signal means, a main source of operating voltage for said differential amplifier means, output means for said amplifier means, circuit means operatively controlled by said output means for supplying load current from the main source of operating voltage to said motor winding; the improvement comprising a first resistor in the control circuit means for effecting a voltage drop varying with the load current supplied the motor winding, a first current flow control device having electrodes between which a current flow may be effected and current flow control elements, means connecting said current flow control elements across said first resistor, a second resistor connected in another circuit between said main source of operating voltage and said electrodes, said current flow control elements of said first control device being responsive to the voltage drop across said first resistor element for controlling the current flow between said electrodes and in said other circuit so as to maintain a voltage drop across said second resistor proportional to the load current supplied the motor winding, a second current flow control device having electrodes between which a current flow may be effected and current flow control elements, means connecting said current flow control elements of said second control device across said second resistor including a Zener diode connected in a third circuit with the said main source of operating voltage, the electrodes of said second current flow control device being connected in a fourth controlled circuit, said main source of operating voltage effecting through said third circuit a constant breakdown voltage drop across said Zener diode to provide a threshold voltage acting in opposition to the voltage drop across said first resistor and biasing said current flow control elements of said second current flow control device in a sense to prevent flow of current between the electrodes of said second current flow control device and in said fourth controlled circuit until the voltage drop across said second resistor exceeds said threshold voltage, and said control elements of said second current flow control device being rendered effective by a voltage drop across said second resistor in excess of said threshold voltage to cause a flow of current between the electrodes of said second current flow control device and in said fourth controlled circuit, and means operable by the flow of current in said fourth controlled circuit for effecting the gain varying means of said differential amplifier means in such a sense as to decrease the gain of the differential amplifier means so as to prevent a load current in excess of a predetermined value from being supplied to said motor winding.

4. In a control system of a type including an electric motor, an energizing winding for the motor, first and second direct current signal means, a differential amplifier means including means for varying gain of said amplifier means, input means for said differential amplifier means controlled by said direct current signal means, a main source of operating voltage for said differential amplifier means, output means for said amplifier means, circuit means operatively controlled by said output means for supplying load current from the main source of operating voltage to said motor winding; the improvement comprising a first resistor in the control circuit means for effecting a voltage drop varying with the load current supplied the motor winding, a first current control device having electrodes between which a current flow may be effected and current flow control elements, means connecting said current flow control elements across said first resistor, a second resistor connected in another circuit between said main source of operating voltage and said electrodes, said current flow control elements of said first control device being responsive to the voltage drop across said first resistor element for controlling the current flow between said electrodes and in said other circuit so as to maintain a voltage drop across said second resistor proportional to the load current supplied the motor winding, a second current control device having electrodes between which a current flow may be effected and current flow control elements, means connecting said current flow control elements of said second control device across said second resistor including an auxiliary source of constant voltage connected in a third circuit with said main source of operating voltage, the electrodes of said second current flow control device being connected in a fourth controlled circuit, said auxiliary source of constant voltage providing a threshold voltage acting in opposition to the voltage drop across said first resistor and biasing said current flow control elements of said second current flow control device in a sense to prevent flow of current between the electrodes of said second current flow control device and in said fourth controlled circuit until the voltage drop across said second resistor exceeds said threshold voltage, and said control elements of said second current flow control device being rendered effective by a voltage drop across said second resistor in excess of said threshold voltage to cause a flow of current between the electrodes of said second current flow control device and in said fourth controlled circuit, and means operable by the flow of current in said fourth controlled circuit for effecting the gain varying means of said differential amplifier means in such a sense as to decrease the gain of the differential amplifier means so as to prevent a load current in excess of a predetermined value from being supplied to said motor winding.

References Cited

UNITED STATES PATENTS

| | | | |
|---|---|---|---|
| 2,749,493 | 6/1956 | Fischer | 318—144 X |
| 2,884,578 | 4/1959 | Bradburn et al. | 318—144 X |
| 3,108,214 | 10/1963 | Wilkerson | 318—144 |
| 3,155,891 | 11/1964 | Rosa | 318—144 X |
| 3,305,720 | 2/1967 | Safar | 318—144 X |
| 2,754,463 | 7/1956 | Hansen et al. | 318—434 X |
| 2,812,485 | 11/1957 | Schieber | 318—448 |
| 3,109,970 | 11/1963 | Smyth | 318—448 X |
| 3,134,065 | 5/1964 | Minarik | 318—434 X |
| 3,216,676 | 11/1965 | Brown et al. | 318—18 X |
| 3,252,101 | 5/1966 | Gorbatenko | 318 |

ORIS L. RADER, *Primary Examiner.*

G. SIMMONS, *Assistant Examiner.*

UNITED STATES PATENT OFFICE
CERTIFICATE OF CORRECTION

Patent No. 3,388,307            June 11, 1968

Frank Prapis et al.

It is certified that error appears in the above identified patent and that said Letters Patent are hereby corrected as shown below:

Column 9, line 53, after "current" insert -- flow --.
Column 10, line 10, after "current" insert -- flow --.

Signed and sealed this 18th day of November 1969.

(SEAL)
Attest:

Edward M. Fletcher, Jr.          WILLIAM E. SCHUYLER, JR.
Attesting Officer                  Commissioner of Patents